United States Patent
Trochtchanovitch et al.

(10) Patent No.: US 12,461,363 B1
(45) Date of Patent: Nov. 4, 2025

(54) DISPERSION-COMPENSATED OPTICAL ASSEMBLY AND SYSTEM

(71) Applicant: Meta Platforms Technologies, LLC, Menlo Park, CA (US)

(72) Inventors: Pavel Trochtchanovitch, Redmond, WA (US); Yun-Han Lee, Redmond, WA (US); Zhisheng Yun, Sammamish, WA (US); Hyunmin Song, Redmond, WA (US); Sascha Hallstein, Saratoga, WA (US); Yusufu Njoni Bamaxam Sulai, Snohomish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 865 days.

(21) Appl. No.: 17/580,534

(22) Filed: Jan. 20, 2022

(51) Int. Cl.
  *G02B 27/00* (2006.01)
  *G02B 5/18* (2006.01)
  *G02B 5/32* (2006.01)

(52) U.S. Cl.
  CPC ....... *G02B 27/0037* (2013.01); *G02B 5/1866* (2013.01); *G02B 5/32* (2013.01)

(58) Field of Classification Search
  None
  See application file for complete search history.

(56) References Cited

U.S. PATENT DOCUMENTS

| | | | | |
|---|---|---|---|---|
| 5,210,626 A | * | 5/1993 | Kumayama | G02B 27/0103 345/9 |
| 6,095,652 A | * | 8/2000 | Trayner | G02B 5/32 359/33 |
| 2018/0074340 A1 | * | 3/2018 | Robbins | G02B 27/0172 |
| 2018/0275350 A1 | * | 9/2018 | Oh | G02B 5/1842 |
| 2019/0318706 A1 | * | 10/2019 | Peng | G09G 3/007 |
| 2022/0413603 A1 | * | 12/2022 | Held | G02B 27/0093 |

FOREIGN PATENT DOCUMENTS

WO WO-2021032072 A1 * 2/2021 ......... G02B 27/0081

* cited by examiner

*Primary Examiner* — Jyotsna V Dabbi
(74) *Attorney, Agent, or Firm* — Greenberg Traurig, LLP

(57) ABSTRACT

An optical assembly includes a first grating for redirecting a polychromatic light beam, e.g. for deviating light path of an optical system away from an optical train of some other optical sub-system. The first grating exhibits chromatic dispersion, resulting in imaging aberrations in the optical system relying on the first grating to deviate the light path. A second grating with lesser chromatic dispersion but closer to the imaging camera may be used to undo the chromatic dispersion induced blurring of the image caused by the first grating, resulting in sharpening of the final image.

20 Claims, 9 Drawing Sheets

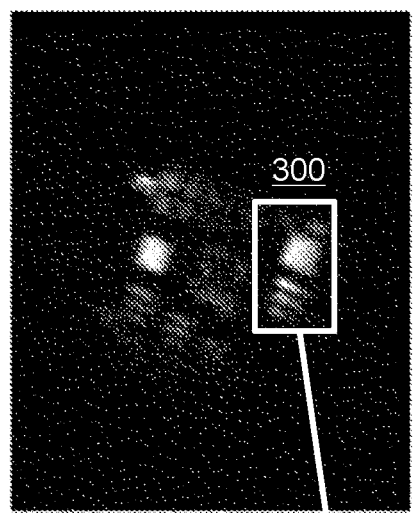
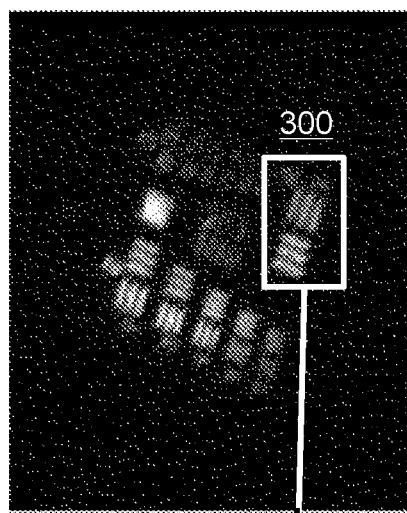
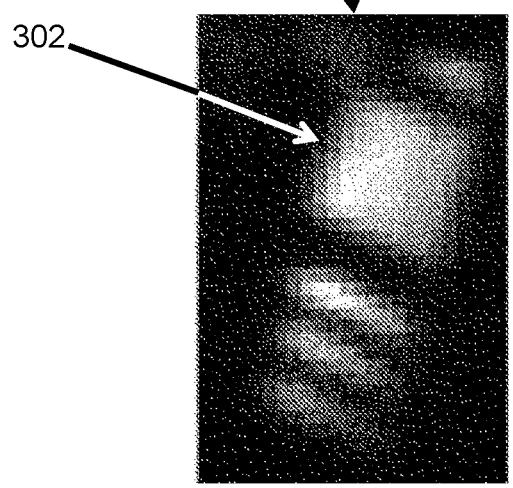
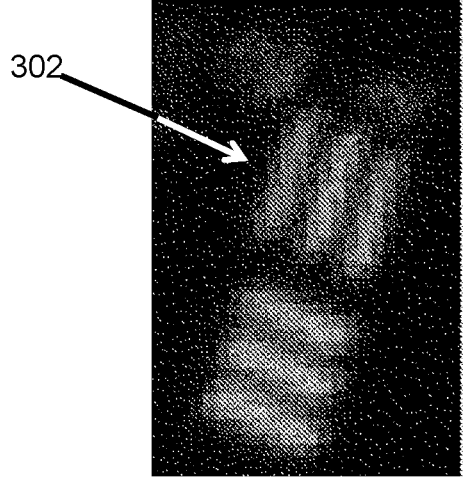
FIG. 3A  FIG. 3B

 US 12,461,363 B1

DISPERSION-COMPENSATED OPTICAL ASSEMBLY AND SYSTEM

TECHNICAL FIELD

The present disclosure relates to diffractive optical elements and optical systems and methods aimed at mitigating chromatic dispersion.

BACKGROUND

Diffractive optical elements may deviate, focus or defocus, or disperse light rays by wavelength. Diffractive optical elements have found a widespread use in such areas as optical test and measurement, holography, remote sensing, imaging, etc. Due to their lightweight, compactness, and high optical throughput, diffractive elements are sometimes used in visual displays.

Visual displays provide information to viewer(s) including still images, video, data, etc. Visual displays have applications in diverse fields including entertainment, education, engineering, science, training, advertising, to name just a few examples. Some visual displays, such as TV sets, display images to several users, while some visual display systems, such s near-eye displays (NEDs), are intended for use by individual viewers.

An artificial reality system generally includes an NED (e.g., a headset or a pair of glasses) configured to present content to a user. The NED may display virtual objects or combine images of real objects with virtual objects in virtual reality (VR), augmented reality (AR), or mixed reality (MR) applications. For example, in an AR system, a user may view images of virtual objects (e.g., computer-generated images) superimposed with the surrounding environment by seeing through a "combiner" component. The combiner of a wearable display is typically transparent to external light but includes some light routing optic to direct the display light into the user's field of view.

Because a display of HMD or NED is typically worn on the head of a user, a large, bulky, unbalanced, and/or heavy display device would be cumbersome and uncomfortable for the user to wear. Consequently, head-mounted display devices can benefit from a compact and efficient configuration, including efficient light sources and illuminators providing illumination of a display panel, high-throughput ocular lenses, reflectors, and diffractive optical elements in the image forming train. The compact optical elements, however, may suffer from aberrations and other defects.

BRIEF DESCRIPTION OF THE DRAWINGS

Exemplary embodiments will now be described in conjunction with the drawings, in which:

FIG. 3A is a test pattern image in the optical assembly of FIG. 1A;

FIG. 3B is a test pattern image in the optical assembly of FIG. 1B;

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1A:
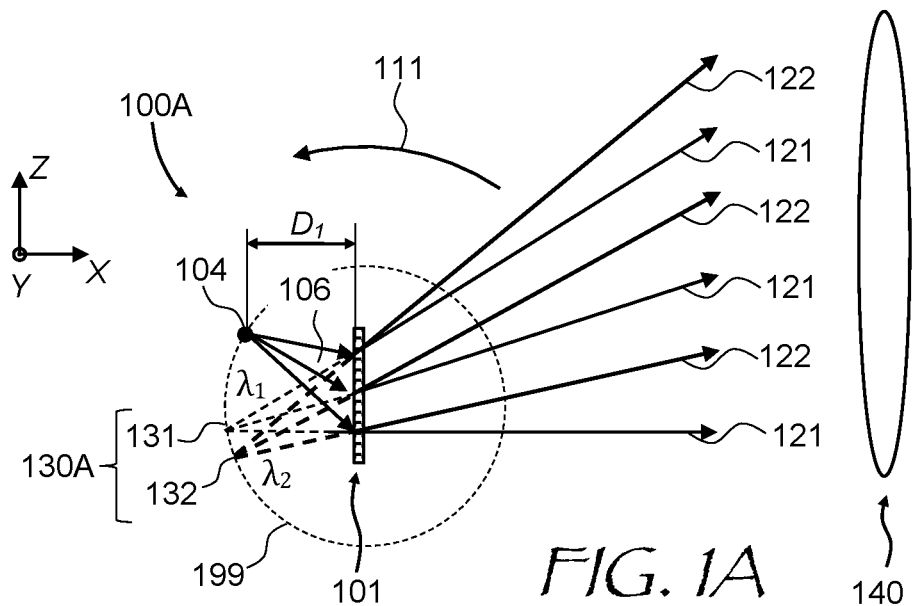
FIG. 1A is a side cross-sectional view of an optical assembly including a grating redirecting light rays from a point source, the grating exhibiting chromatic dispersion.
Figure 1B:
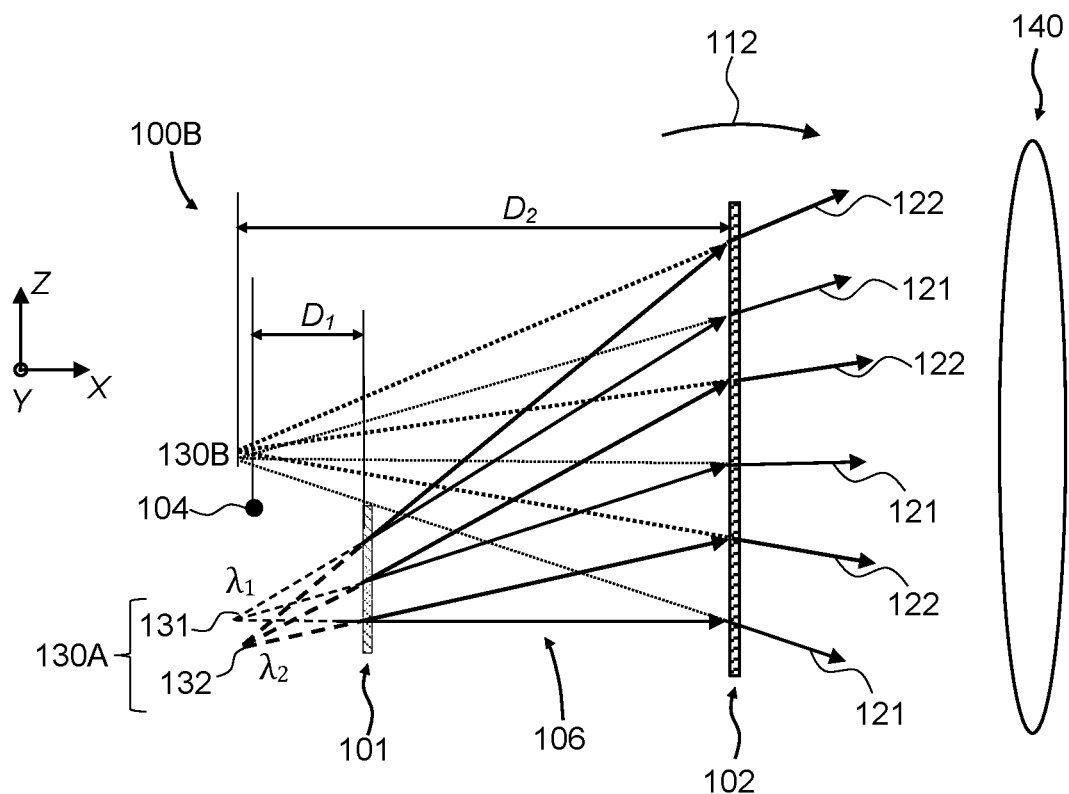
FIG. 1B is a side cross-sectional view of an optical assembly including the grating of FIG. 1A and a compensating grating configured to reduce blurring of a virtual image of the point source by the first grating.
Figure 4:
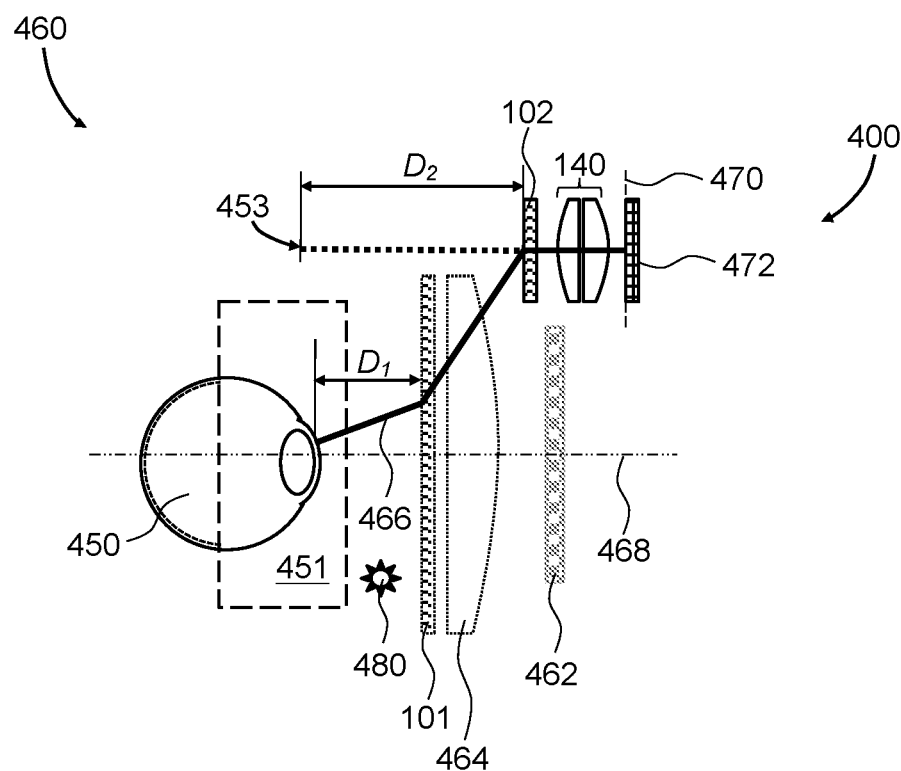
FIG. 4 is a schematic cross-sectional view of an imaging system using the optical assembly of FIG. 1B to lessen chromatically induced image blurring.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1A-1B and FIG. 4, similar number refer to similar elements.

Diffraction gratings may be used in imaging optical systems for redirecting light beams. Diffraction gratings with spatially varying direction and/or spacing of grooves or fringes may be used for shaping and refocusing the light beams. The light beams may be deflected, steered, dispersed, reshaped, split, etc. in accordance with the required function of the optical system. Grating structures may be very compact and may be formed on, or supported by other optical elements. Some types of diffraction gratings, such as volumetric Bragg gratings or VBGs, are direction-selective and may be used to redirect some light beams while passing through other light beams, depending on the beam angle and/or wavelength, providing versatility of configuring an optical system for its intended purpose.

Diffraction gratings are wavelength-selective. An angle of diffraction of a light beam impinging onto a diffraction grating depends on the wavelength of the impinging light beam. This may present a problem in polychromatic imaging systems where it is desirable to deviate or deflect all wavelength components of a light beam by a same angle. When different wavelength components are deviated by different angles, the resulting image formed by the polychromatic imaging system may be rainbowed, color-blurred, or distorted.

In accordance with this disclosure, the chromatic dispersion of a grating in an optical train may be mitigated by providing a second grating downstream of and spaced apart from the first grating in the optical train. The function of the second grating is to undo the chromatic dispersion of the first grating while preserving a beam redirecting property of the first grating, such a sufficiently sharp image may be formed. The optical assembly comprising the two gratings may be used, for example, to deviate the polychromatic image forming light from a main light path that may be occupied by another optical system or subsystem, resulting in a very compact and highly integrated multifunctional optical configuration.

In accordance with the present disclosure, there is provided an optical assembly comprising a first grating having a first pitch, for deflecting a polychromatic light beam in a first direction, and a second grating having a second pitch. The polychromatic light beam is provided by a source at a first optical distance from the first grating. The second grating is disposed downstream of the first grating at a second optical distance from a virtual image of the source formed by the second grating. The second optical distance is larger than the first optical distance, and the second pitch is larger than the first pitch. The second grating is configured to deflect the polychromatic light beam in a second direction opposite to the first direction to lessen a blurring of the virtual image of the source. The blurring is caused by chromatic dispersion of the first grating.

A ratio of the second optical distance to the first optical distance may be equal to a ratio of the second pitch to the first pitch to within 25%, or in some embodiments, to within 5% of each other. The first and second gratings may have substantially zero optical power, i.e. substantially zero focusing/defocusing power. At least one of the first or second gratings may include e.g. a volumetric Bragg grating (VBG) and/or a polarization volumetric hologram (PVH).

In some embodiments, the optical assembly further includes an objective downstream of the second grating for forming, at a focal plane, a real image of the source from the virtual image of the source. In such embodiments, the second grating may be configured to lessen a blurring of the real image of the source caused by the chromatic dispersion of the first grating. A detector array may be disposed at the focal plane for detecting the real image of the source.

In accordance with the present disclosure, there is provided an imaging system comprising the first and second gratings described above, and an objective downstream of the second grating for forming an image of the object at a focal plane. The second grating may be configured to steer the light in a second direction opposite to the first direction to lessen a blurring of the image of the object at the focal plane caused by chromatic dispersion of the first grating. A detector array may be provided at the focal plane for detecting the image of the object formed by the objective at the focal plane.

In some embodiments of the imaging system, the object to be imaged is an eye viewing an image through a near-eye optic, and the first direction forms an acute angle with an optical axis of the near-eye optic. The first grating may be mounted to the near-eye optic.

In accordance with the present disclosure, there is further provided a method for reducing chromatic dispersion in a diffractive optical system including a first grating deflecting a polychromatic light beam in a first direction. The method includes using a second grating to deflect the polychromatic light beam in a second direction opposite the first direction. The second grating is disposed downstream of the first grating at a distance from the first grating. A magnitude of deflection of the polychromatic light beam by the second grating is less than a magnitude of deflection of the polychromatic light beam by the first grating.

The first and second gratings may deflect the polychromatic light beam substantially without focusing or defocusing the polychromatic light beam. The polychromatic light beam may be provided by a source at a first optical distance from the first grating. The second grating may be disposed at a second optical distance from a virtual image of the source formed by the second grating. The second optical distance may be larger than the first optical distance. The deflection of the polychromatic light beam by the second grating may result in lessening of blurring of the virtual image of the source caused by chromatic dispersion of the first grating.

Referring now to FIG. 1A, an optical assembly 100A includes a first grating 101 having a first grating pitch $P_1$. The first grating 101 may be, for example, a surface-relief grating, a buried refractive grating, a hologram, a VBG, a polarization volumetric hologram (PVH) grating, etc. The latter two grating types will be considered in more detail further below. The function of the first grating 101, regardless of its type, is to deflect or redirect a polychromatic light beam 106 in a first direction denoted with an arrow 111, which corresponds to a counterclockwise rotation about Y-axis (i.e. rotation in plane of FIG. 1A) in this example. The polychromatic light beam 106 may be provided by a source 104 disposed at a first optical distance $D_1$ from the first grating 101. The source 104 is a point source, for simplicity. Extended sources may also be used. The source 104 may represent an illuminated object, an actual light source, etc.

Since the light beam 106 is polychromatic, different wavelength components of the light beam 106 will be deflected, i.e. diffracted, at different angles. A shorter wavelength component 121 at a wavelength 2, will be diffracted by a smaller angle than a longer wavelength component 122 at a wavelength 12. The shorter wavelength component 121 is shown in thin lines while the longer wavelength component 122 is shown with thick lines. Both wavelength components 121 and 122 are shown in ZX plane. In a paraxial approximation, the rotation denoted with the arrow 111 images a point source onto a point source located on a circular locus 199 depicted with a dashed line. The shorter wavelength component 121 forms a first virtual image 131 of the source 104, and the longer wavelength component 122 forms a second virtual image 132 of the source 104. The virtual image formation is illustrated in FIG. 1A with converging dashed lines-thin dashed lines for the shorter wavelength component 121 and thick dashed lines for the longer wavelength component 122 respectively. The two virtual images 131, 132 are offset relative to one another due to the chromatic dispersion of the first grating 101, causing a blurring of an overall virtual image 130A of the source 104. The virtual image 130A may be converted into a real image by an objective 140, such as a singlet or compound refractive lens, for example. The objective 140 may include e.g. a collimator, an ocular lens, a projector lens, a concave mirror, etc. Herein, the term "virtual image" refers to images formed by reverse-tracing the rays to their imaginary point of intersection, while the term "real image" refers to images formed by the rays propagating towards their points of intersection at the focal plane.

Turning to FIG. 1B, an optical assembly 100B has the same elements as the optical assembly 100A of FIG. 1A and further includes a second grating 102 having a second grating pitch $P_2$ larger than the first pitch $P_1$, such that the dispersion of the second grating 102 is smaller than that of the first grating 101. The second grating 102 may be, for example, a surface-relief grating, a buried grating, a hologram, a VBG, a PVH, etc. The second grating 102 is disposed downstream of the first grating 101 at a second optical distance $D_2$ from a virtual image 130B of the source 104. The virtual image 130B is formed by the second grating 102 and is greater than the first optical distance $D_1$ between the source 104 and the first grating 101. Herein, the term "downstream", or "upstream" for that matter, relates to the optical path of the polychromatic light beam 106, with the direction defined by the direction of propagation of the polychromatic light beam 106 along the optical path. In FIG. 1B, the optical path is shown beginning from the diffraction of the polychromatic light 106 on the first grating 101, for brevity; the shorter wavelength component 121 is shown in thin lines, and the longer wavelength component 122 is shown with thick lines. The term "optical distance" or "optical path length" relates to a physical length L of an optical path multiplied by a refractive index n along the optical path.

Due to the presence of the second grating 102, the shorter wavelength component 121 and the longer wavelength component 122 form the virtual image 130B of the source 104. The blurring of the virtual image 130B caused by the chromatic dispersion of the first grating 101 is considerably reduced or lessened. The virtual image formation is illustrated in FIG. 1B with thin dashed lines for the shorter wavelength component 121 and thick dashed lines for the longer wavelength component 122. The dispersion of the second grating 102 is smaller than the dispersion of the first grating 101 such that the second grating 102 does not completely undo the rotation of individual wavelength components. Surprisingly, the presence of the second grating 102 results in a considerable reduction of the blurring of the virtual image 130B of the source 104, even though its dispersion is smaller. Thus, the addition of the second grating 102 enables use of polychromatic light sources in imaging systems relying on gratings for defining an optical path. Polychromatic light sources may be preferable for a number of reasons, including reduction of speckle patterns, increase of overall optical power, etc.

The greater the distance between the first 101 and second 102 gratings, the less the chromatic dispersion of the second grating 102 needs to be to undo the image blurring induced by the chromatic dispersion of the first grating 101. The lesser dispersion may be provided by the greater pitch of the second grating 102. As a general rule, the ratio of the second optical distance $D_2$ between the second grating 102 and the virtual image 130B to the first optical distance $D_1$ between the first grating 101 and the source 104 may be approximately equal to the ratio of the second grating 102 pitch $P_2$ to the first grating 101 pitch $P_1$:

$$D_2/D_1 \approx P_2/P_1 \quad (1A),$$

or, for cases where the refractive index $n_2$ between the first 101 and second 102 gratings is different from the refractive index $n_1$ between the light source 104 and the first grating 101, $$\frac{n_1 L_1 + n_2(L_2 - L_1)}{n_1 L} \approx \frac{P_2}{P_1} \quad (1B)$$

where the $L_1$ and $L_2$ are lengths (physical distances) corresponding to the first $D_1$ and second $D_2$ optical distances, respectively.

For example, the ratio $P_2/P_1$ may be matched to the ratio $D_2/D_1$ to within 25% of each other, or in some embodiments to within 5% of each other, for the blurring to be efficiently reduced.

In some embodiments, the first 101 and second 102 gratings have substantially zero optical power i.e. focusing or defocusing power. Herein, the term "substantially zero optical power" or the term "substantially without focusing or defocusing" relates to the optical power of less than +0.25 Diopter. However, the blurring reduction can work not only with straight 1D gratings, i.e. the first 101 and second 102 gratings need not be 1D gratings with straight grating lines having zero optical power. In some embodiments, the first 101 and second 102 gratings may be holograms that have spatially varying line or fringe patterns. For example, the grating fringes may run generally parallel to one another while making turns and/or changing distance between the grating lines (i.e. changing the grating pitch).

The virtual images 130A, 130B may be converted into a real image by an imaging element. For example, in FIG. 1B, the objective 140 may be placed downstream of the second grating 102 for forming, at a focal plane, a real image of the source from the virtual image. The introduction of the second grating 102 enables one to lessen chromatically induced blurring or broadening of both the virtual and real images. The real image blurring reduction is illustrated further below in FIGS. 2A and 2B and FIGS. 3A and 3B.

Figure 2A:
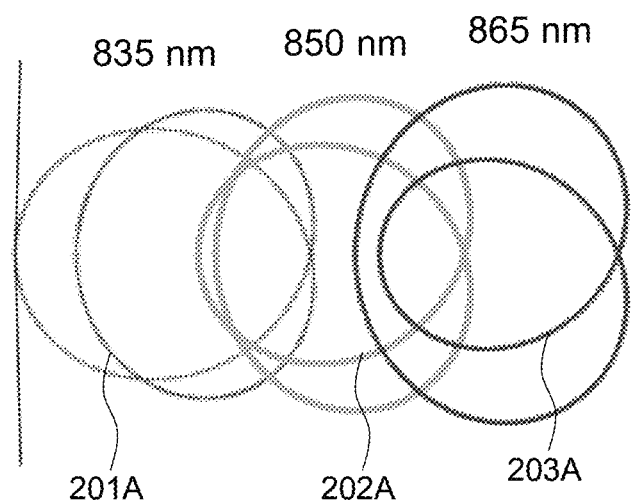
FIG. 2A is a computed spot diagram of a focused source image in the optical assembly of FIG. 1A.

FIG. 2A is a focal spot diagram for the optical assembly 100A of FIG. 1A. A cone of rays was numerically traced from the source 104 to the focal plane of the objective 140 for wavelengths of 835 nm, 850 nm, and 865 nm in the near-infrared wavelength range. The rays at the wavelengths of 835 nm, 850 nm, and 865 nm formed focal spots 201A, 202A, and 203A respectively. It is seen that the focal spots 201A, 202A, and 203A are offset from one another in FIG. 2A indicating chromatically induced blurring of the image of the source 104.

Figure 2B:
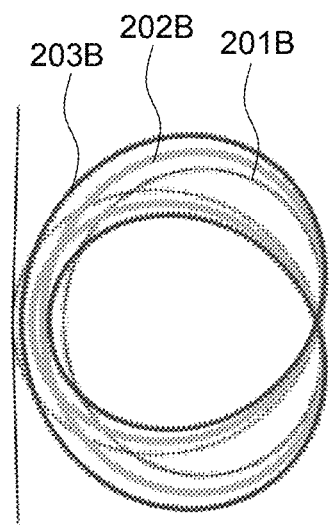
FIG. 2B is a computed spot diagram of a focused source image in the optical assembly of FIG. 1B.

FIG. 2B is a focal spot diagram for the optical assembly 100B of FIG. 1B. The rays at the wavelengths of 835 nm, 850 nm, and 865 nm formed focal spots 201B, 202B, and 203B respectively. It is seen that the focal spots 201B, 202B, and 203B overlap one another in FIG. 2B indicating the compensation of the chromatically induced blurring of the image of the source 104 by the second grating 102.

The reduction of chromatically induced image blurring has been experimentally confirmed. FIG. 3A corresponds to the optical assembly 100A of FIG. 1A, and FIG. 3B corresponds to the optical assembly 100B of FIG. 1B. In both cases, the source 104 was replaced with a test reticle including a set of orthogonal white bars on black background. Referring first to FIG. 3A with further reference to FIG. 1A, a fragment 300 of the test reticle image shows that vertical bars are washed out by chromatic dispersion of the first grating 101. Turning for comparison to FIG. 3B with further reference to FIG. 1B, the introduction of the compensating second grating 102 reduces the blurring of the fragment 300, and the vertical bars 302 are clearly visible.

Referring now to FIG. 4, an imaging system 400 obtains images of a human eye 450. The imaging system 400 is a part of a near-eye display (NED) 460 that projects images generated by a display panel 462 to the eye 450 through a near-eye optic 464 such as a refractive lens or a pancake lens, for example. The imaging system 400 is used to track the eye's 450 position and orientation in an eyebox 451 and to provide feedback to the display controller that may adjust the near-eye optic 464 and/or the image displayed by the display panel 462 depending on the determined eye position and orientation, to improve image quality and/or to interact with the user of the NED 460. The eye 450 may be illuminated with a light source 480, e.g. an infrared light source to make the illumination of the eye inconspicuous to the viewer. Due to the chromatic dispersion correction by the second grating 102, the infrared light source may be a polychromatic infrared light source emitting infrared light at a plurality of infrared wavelengths. The polychromatic illumination enables one to reduce speckles in the detected eye image, and enables one to increase the power of the illuminating light.

The imaging system 400 is based on the optical assembly 100B of FIG. 1B. The imaging system 400 of FIG. 4 includes the first grating 101 having the first pitch $P_1$, for deflecting light reflected from the eye 450 to propagate off-axis. The optical path of the diffracted light is illustrated with a thick black line 466 indicating an optical path of the imaging system 400. In other words, a portion of the optical path 466, corresponding to the light deflected by the first grating 101, forms an acute angle with an optical axis 468 of the near-eye optic 464, or put it differently, the direction of the diffracted rays forms the acute angle with the optical axis 468. The first grating 101 is disposed at the first optical distance/from the eye 450. The first grating 101 may be supported, e.g. mounted to, the near-eye optic 464.

The imaging system 400 further includes the second grating 102 having the second pitch $P_2$. The second grating 102 is disposed downstream of the first grating 101 on the optical path 466 at the second optical distance $D_2$ from a virtual image 453 of the eye 450 formed by the second grating 102. Just like in the optical assembly 100B of FIG. 1B, the second optical distance $D_2$ is larger than the first optical distance $D_1$ and the second pitch $P_2$ is larger than the first pitch $P_1$. The second grating 102 is configured to steer the light beam in the second direction opposite to the first direction to lessen the blurring of the image of the eye caused by chromatic dispersion of the first grating 101. The lessening effect is greater when conditions (1A) and (1B) above are fulfilled. The objective 140 may be disposed downstream of the second grating 102 for forming a real image of the eye at a focal plane 470.

A detector array 472 may be disposed at the focal plane 470 of the objective 140 for detecting the image of the eye formed by the objective 140. In operation, the imaging system 400 provides images of the eye 450 to the controller, not shown, of the NED 460. It is to be noted that the NED 460 environment is only one non-limiting example of application of the imaging system 400. An imaging system based on the optical assembly 100B of FIG. 1 may be used to image any object, not necessarily a human eye, in a situation where off-axis imaging is preferable, or in any other suitable situation. The pair of gratings 101, 102 may be used to deflect the light path to suit the required position of the optical axis without having to suffer from chromatically induced blurring of the object being imaged.

Figure 5:
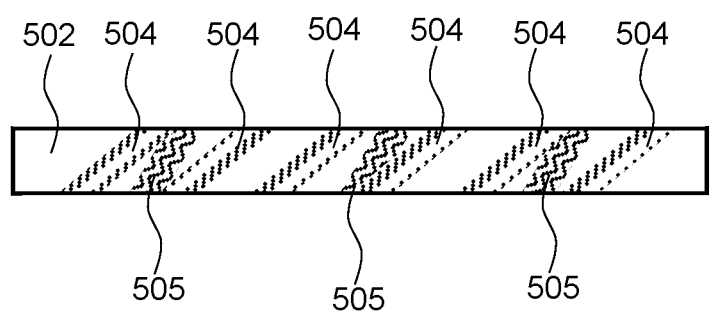
FIG. 5 is a side cross-sectional view of a volumetric Bragg grating (VBG) usable in the optical assembly of FIG. 1B and the imaging system of FIG. 4.

Referring to FIG. 5, a VBG 500 may be used as the first 101 and/or second 102 grating in the assembly 100B of FIG. 1B and the imaging system 400 of FIG. 4. The VBG 500 includes a substrate 502 of a first refractive index, e.g. a transparent slab of glass, plastic, polymer, etc., and a first plurality of slanted fringes 504 in the substrate 502. The slanted fringes 504 have a second refractive index different from the first refractive index, and optionally remaining constant within the fringe plane while varying in a periodic manner from one fringe to another. The period or pitch of the slanted fringes and the slant angle relative to a plane of the substrate 502 are selected to diffract light beams of certain direction or beam angle and a wavelength. All other beams will propagate through the substrate without deviation. The VBG 500 may further include a second plurality of slanted fringes 505 interspersed with the slanted fringes 504 of the first plurality, at their own slant angle. By providing multiple pluralities or arrays of fringes, each array diffracting a light beam component at a certain angle and wavelength, a desired optical performance of the VBG 500 may be achieved, including beam deflection, reflection, focusing, etc.

Figure 6A:
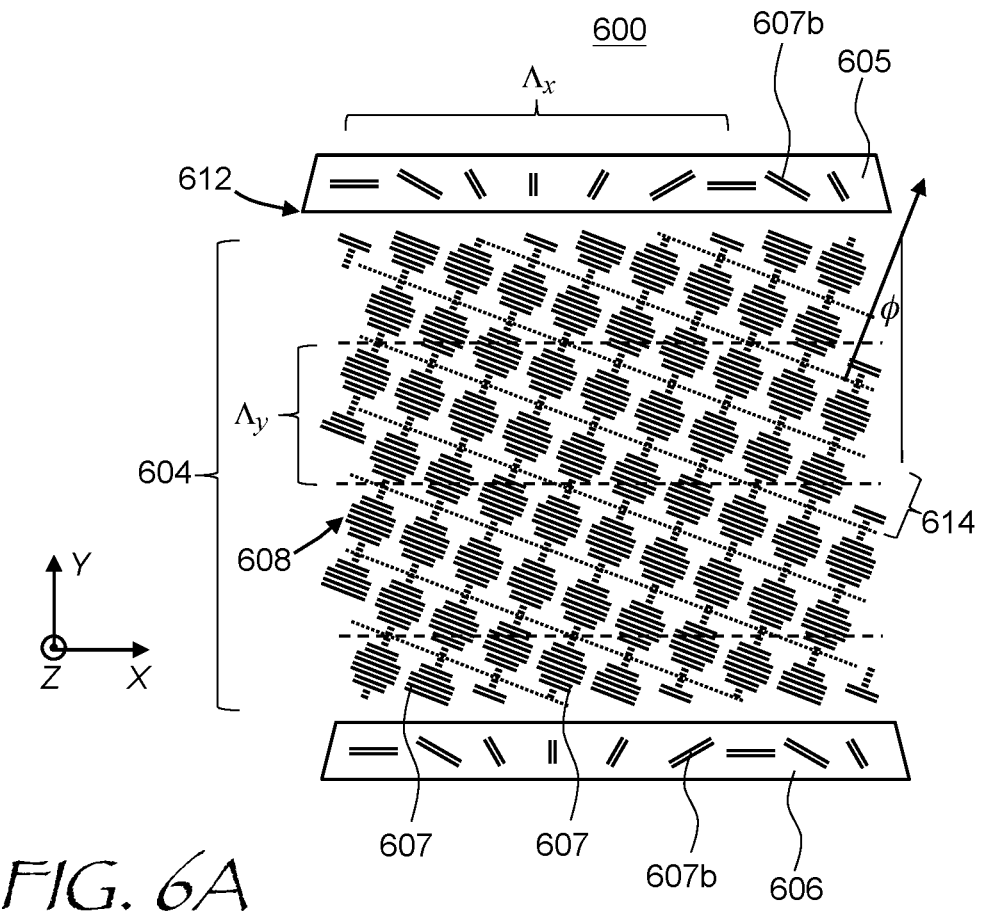
FIG. 6A is a side cross-sectional view of a polarization volumetric grating (PVH) usable in the optical assembly of FIG. 1B and the imaging system of FIG. 4.

Turning to FIG. 6A, a PVH grating 600 may be used as the first 101 and/or second 102 grating in the assembly 100B of FIG. 1B and the imaging system 400 of FIG. 4. The PVH grating 600 includes an LC layer 604 bound by opposed top 605 and bottom 606 parallel surfaces. The LC layer 604 may include an LC fluid containing rod-like LC molecules 607 with positive dielectric anisotropy, e.g. nematic LC molecules. A chiral dopant may be added to the LC fluid, causing the LC molecules in the LC fluid to self-organize into a periodic helical configuration including helical structures 608 extending between the top 605 and bottom 606 parallel surfaces of the LC layer 604. Such a configuration of the LC molecules 607, termed herein a cholesteric configuration, includes a plurality of helical periods p, e.g. at least two, at least five, at least ten, at least twenty, or at least fifty helical periods p between the top 605 and bottom 606 parallel surfaces of the LC layer 604.

Boundary LC molecules 607b at the top surface 605 of the LC layer 604 may be oriented at an angle to the top surface 605. The boundary LC molecules 607b may have a spatially varying azimuthal angle, e.g. linearly varying along X-axis parallel to the top surface 605, as shown in FIG. 6A. To that end, an alignment layer 612 may be provided at the top surface 605 of the LC layer 604. The alignment layer 612 may be configured to provide the desired orientation pattern of the boundary LC molecules 607b, such as the linear dependence of the azimuthal angle on the X-coordinate. A pattern of spatially varying polarization directions of the UV light may be selected to match a desired orientation pattern of the boundary LC molecules 607b at the top surface 605 and/or the bottom surface 606 of the LC layer 604. When the alignment layer 612 is coated with the cholesteric LC fluid, the boundary LC molecules 607b are oriented along the photopolymerized chains of the alignment layer 612, thus adopting the desired surface orientation pattern. Adjacent LC molecules adopt helical patterns extending from the top 605 to the bottom 606 surfaces of the LC layer 604, as shown.

The boundary LC molecules 607b define relative phases of the helical structures 608 having the helical period p. The helical structures 608 form a volume grating comprising helical fringes 614 tilted at an angle φ, as shown in FIG. 6A. The steepness of the tilt angle φ depends on the rate of variation of the azimuthal angle of the boundary LC molecules 607b at the top surface 605 and p. Thus, the tilt angle φ is determined by the surface alignment pattern of the boundary LC molecules 607b at the alignment layer 612. The volume grating has a period $\Lambda_x$ along X-axis and $\Lambda_y$ along Y-axis. In some embodiments, the periodic helical structures 608 of the LC molecules 607 may be polymer-stabilized by mixing in a stabilizing polymer into the LC fluid, and curing (polymerizing) the stabilizing polymer.

Figure 6B:
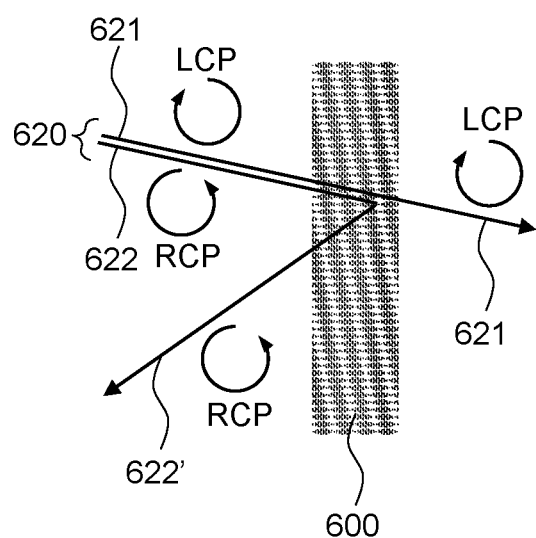
FIG. 6B is a diagram illustrating optical performance of the PVH of FIG. 6A.

The helical nature of the fringes 614 of the volume grating makes the PVH grating 600 preferably responsive to light of polarization having one particular handedness, e.g. left- or right-circular polarization, while being substantially non-responsive to light of the opposite handedness of polarization. Thus, the helical fringes 614 make the PVH grating 600 polarization-selective, causing the PVH grating 600 to diffract light of only one handedness of circular polarization. This is illustrated in FIG. 6B, which shows a light beam 620 impinging onto the PVH grating 600. The light beam 620 includes a left circular polarized (LCP) beam component 621 and a right circular polarized (RCP) beam component 622. The LCP beam component 621 propagates through the PVH grating 600 substantially without diffraction. Herein, the term "substantially without diffraction" means that, even though an insignificant portion of the beam (the LCP beam component 621 in this case) might diffract, the portion of the diffracted light energy is so small that it does not impact the intended performance of the PVH grating 600. The RCP beam component 622 of the light beam 620 undergoes diffraction, producing a diffracted beam 622'. The polarization selectivity of the PVH grating 600 results from the effective refractive index of the grating being dependent on the relationship between the handedness, or chirality, of the impinging light beam and the handedness, or chirality, of the grating fringes 614. It is further noted that sensitivity of the PVH 600 to right circular polarized light in particular is only meant as an illustrative example. When handedness of the helical fringes 614 is reversed, the PVH 600 may be made sensitive to left circular polarized light.

Figure 7:
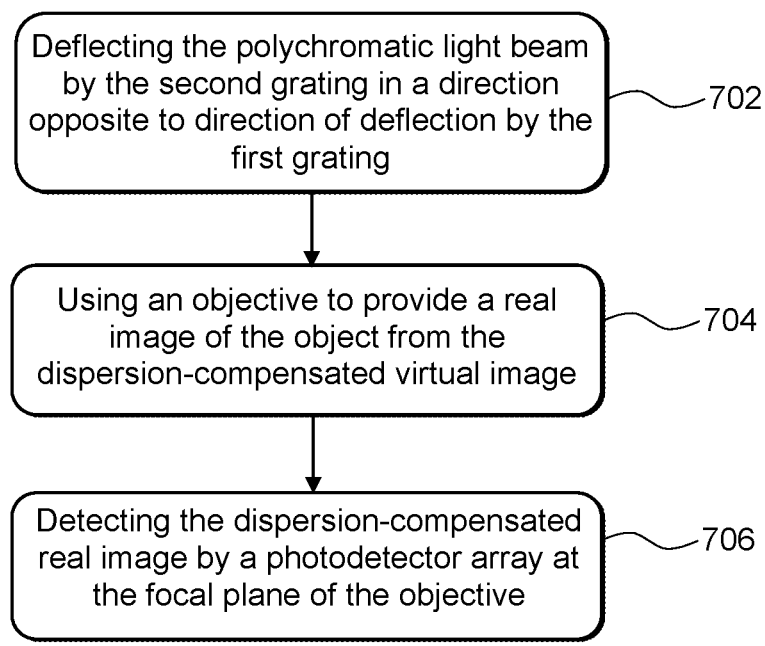
FIG. 7 is a flow chart of a method for reducing chromatic dispersion in a diffractive optical system.

Referring now to FIG. 7 with further reference to FIGS. 1A and 1B, a method 700 may be used to reduce a chromatic dispersion induced image blurring in a diffractive optical system including the first grating 101 deflecting the polychromatic light beam 106 in the first direction 111. The method 700 includes using (702) the second grating 102 to deflect the polychromatic light beam 106 in the second direction 112 opposite the first direction 111. As described above with reference to FIG. 1B, the second grating 102 is disposed downstream of the first grating 111 at a distance from the first grating 111. A magnitude of deflection of the polychromatic light beam 106 by the second grating 102 is less than a magnitude of deflection of the polychromatic light beam 106 by the first grating 101. The first 101 and second 102 gratings may deflect the polychromatic light beam 106 substantially without focusing or defocusing the polychromatic light beam 106.

The polychromatic light beam 106 may be provided by the source 104, e.g. an illuminated object placed at the first optical distance $D_1$ from the first grating 101. The second grating 102 may be disposed at the second optical distance $D_2$ from the source 104 larger than the first optical distance $D_1$. The deviation of the polychromatic light beam 106 by the second grating 102 lessens a blurring of a virtual image of the source 104 caused by chromatic dispersion of the first grating 101.

The method 700 may further include providing (704) a real image from the virtual image e.g. using the objective 140. The deviation of the polychromatic light beam 106 by the second grating 102 lessens a blurring of the real image of the source 104 provided by the objective 140. The method 700 may further include detecting (706) the real image by a photodetector array, e.g. by the photodetector array 472 of the imaging system 400 of FIG. 4. The method 700 may be used e.g. to reduce dispersion-induced blurring of an eye image in an eye detection system and/or an eye tracking system.

Figure 8:
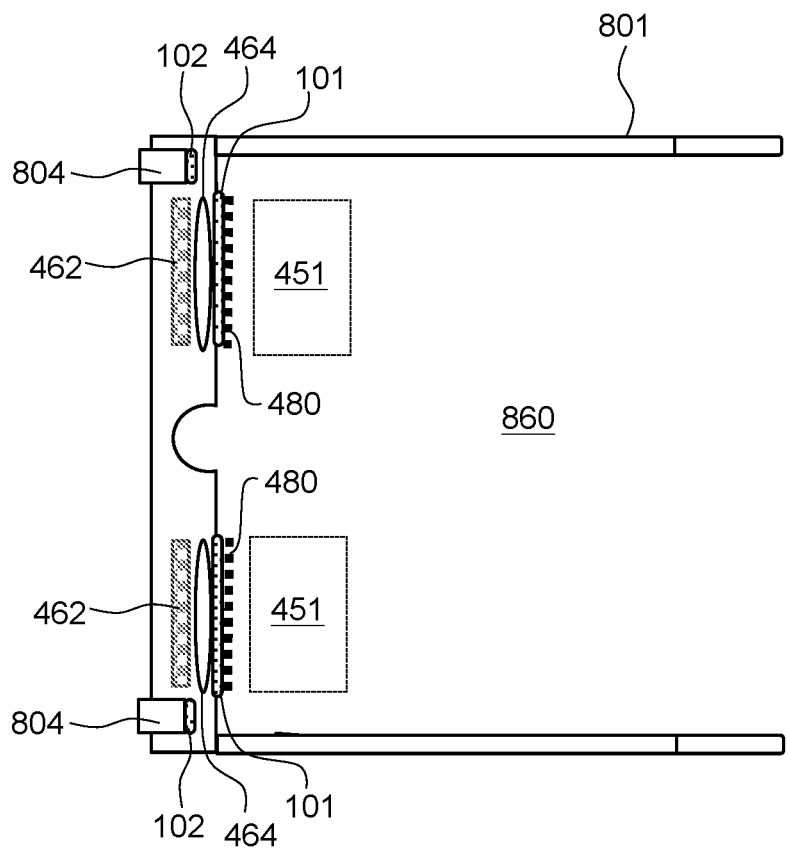
FIG. 8 is a view of an augmented reality (AR) display of this disclosure having a form factor of a pair of eyeglasses.

Referring to FIG. 8, a virtual reality (VR) NED 860 is an implementation of the NED 460 of FIG. 4, and includes the elements of the imaging system 400. The VR NED 860 of FIG. 8 includes a frame 801 supporting, for each eye: the display panel 462 including an array of display pixels, and the near-eye optic (ocular lens) 464 for converting the image in linear domain generated by the display panel 462 into an image in angular domain for direct observation by an eye at the eyebox 451. A plurality of infrared polychromatic light sources 480, shown as black dots, may be placed around the eyebox 451 on a nearest surface that faces the eyebox 451. An eye-tracking camera 804 includes an objective and a photodetector array as explained above with reference to FIG. 4. The pair of the gratings 101, 102 is used to reroute the optical path of the eye imaging system away from the optical axis of the near-eye optic 464 while compensating for blurring of the eye image due to chromatic dispersion as explained above.

The purpose of the eye-tracking cameras 804 is to determine position and/or orientation of both eyes of the user. The infrared polychromatic light sources 480 illuminate the eyes at the corresponding eyeboxes 451, allowing the eye-tracking cameras 840 to obtain the images of the eyes, as well as to provide reference reflections of the infrared polychromatic light sources 480, termed glints. The glints may function as reference points in the captured eye image, facilitating the eye gazing direction determination by determining position of the eye pupil images relative to the glints images.

Figure 9:
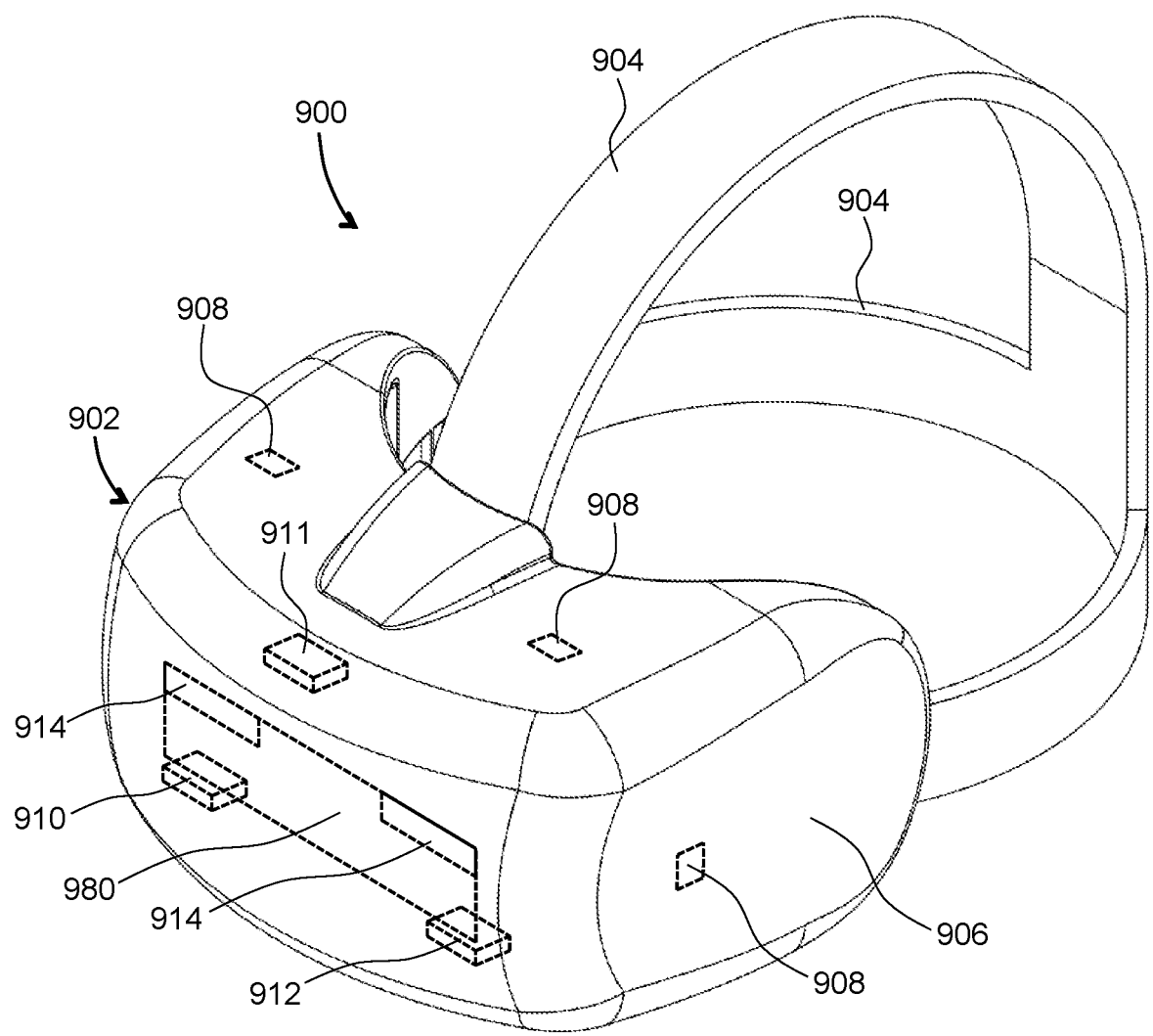
FIG. 9 is a three-dimensional view of a head-mounted display (HMD) of this disclosure.

Turning to FIG. 9, an HMD 900 is an example of an AR/VR wearable display system which encloses the user's face, for a greater degree of immersion into the AR/VR environment. The HMD 900 may generate the entirely virtual 3D imagery. The HMD 900 may include a front body 902 and a band 904 that can be secured around the user's head. The front body 902 is configured for placement in front of eyes of a user in a reliable and comfortable manner. A display system 980 may be disposed in the front body 902 for presenting AR/VR imagery to the user. The display system 980 may include the optical assemblies and imaging systems disclosed herein. Sides 906 of the front body 902 may be opaque or transparent.

In some embodiments, the front body 902 includes locators 908 and an inertial measurement unit (IMU) 910 for tracking acceleration of the HMD 900, and position sensors 912 for tracking position of the HMD 900. The IMU 910 is an electronic device that generates data indicating a position of the HMD 900 based on measurement signals received from one or more of position sensors 912, which generate one or more measurement signals in response to motion of the HMD 900. Examples of position sensors 912 include: one or more accelerometers, one or more gyroscopes, one or more magnetometers, another suitable type of sensor that detects motion, a type of sensor used for error correction of the IMU 910, or some combination thereof. The position sensors 912 may be located external to the IMU 910, internal to the IMU 910, or some combination thereof.

The locators 908 are traced by an external imaging device of a virtual reality system, such that the virtual reality system can track the location and orientation of the entire HMD 900. Information generated by the IMU 910 and the position sensors 912 may be compared with the position and orientation obtained by tracking the locators 908, for improved tracking accuracy of position and orientation of the HMD 900. Accurate position and orientation is important for presenting appropriate virtual scenery to the user as the latter moves and turns in 3D space.

The HMD 900 may further include a depth camera assembly (DCA) 911, which captures data describing depth information of a local area surrounding some or all of the HMD 900. The depth information may be compared with the information from the IMU 910, for better accuracy of determination of position and orientation of the HMD 900 in 3D space.

The HMD 900 may further include an eye tracking system 914 for determining orientation and position of user's eyes in real time. The eye tracking system 914 may include any of the eye tracking systems disclosed herein. The obtained position and orientation of the eyes also allows the HMD 900 to determine the gaze direction of the user and to adjust the image generated by the display system 980 accordingly. The determined gaze direction and vergence angle may be used to adjust the display system 980 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 902.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An optical assembly comprising:
   a first grating having a first pitch, for deflecting a polychromatic light beam in a first direction, wherein the polychromatic light beam is provided by a source at a first optical distance from the first grating; and
   a second grating having a second pitch, wherein:
   the second grating is disposed downstream of the first grating at a second optical distance from a virtual image of the source formed by the second grating, wherein the second optical distance is larger than the first optical distance and the second pitch is larger than the first pitch; and
   the second grating is configured to deflect the polychromatic light beam in a second direction opposite to the first direction to lessen a blurring of the virtual image of the source, wherein the blurring is caused by chromatic dispersion of the first grating;
   wherein at least one of the first grating or the second grating comprises a polarization volumetric hologram (PVH) comprising a liquid crystal layer with at least one fringe having a helical structure, and
   wherein the first grating and the second grating are configured to propagate the polychromatic light beam through the first grating and the second grating.

2. The optical assembly of claim 1, wherein a ratio of the second optical distance to the first optical distance is equal to a ratio of the second pitch to the first pitch to within 25% of each other.

3. The optical assembly of claim 1, wherein a ratio of the second optical distance to the first optical distance is equal to a ratio of the second pitch to the first pitch to within 5% of each other.

4. The optical assembly of claim 1, wherein the first and second gratings have substantially zero optical power.

5. The optical assembly of claim 1, wherein at least one of the first or second gratings comprises a volumetric Bragg grating (VBG).

6. The optical assembly of claim 1, further comprising an objective downstream of the second grating for forming, at a focal plane, a real image of the source from the virtual image of the source;
   wherein the second grating is configured to lessen a blurring of the real image of the source caused by the chromatic dispersion of the first grating.

7. The optical assembly of claim 6, further comprising a detector array at the focal plane for detecting the real image of the source.

8. The optical assembly of claim 1, wherein the at least one fringe having the helical structure of the liquid crystal layer has a pitch that varies along a thickness of the PVH to provide a chirped grating structure.

9. An imaging system comprising:
   a first grating having a first pitch, for deflecting light reflected from an object to be imaged at a first optical distance from the first grating, wherein the light is deflected in a first direction;
   a second grating having a second pitch, wherein the second grating is disposed downstream of the first grating at a second optical distance from a virtual image of the object formed by the second grating, wherein the second optical distance is larger than the first optical distance and the second pitch is larger than the first pitch; and
   an objective downstream of the second grating for forming an image of the object at a focal plane;
   wherein the second grating is configured to steer the light in a second direction opposite to the first direction to lessen a blurring of the image of the object at the focal plane, wherein the blurring is caused by chromatic dispersion of the first grating;

wherein at least one of the first grating or the second grating comprises a polarization volumetric hologram (PVH) comprising a liquid crystal layer with a helical structure, and wherein the first grating and the second grating are configured to propagate the polychromatic light beam through the first grating and the second grating.

10. The imaging system of claim 9, wherein a ratio of the second optical distance to the first optical distance is equal to a ratio of the second pitch to the first pitch to within 25% of each other.

11. The imaging system of claim 9, wherein a ratio of the second optical distance to the first optical distance is equal to a ratio of the second pitch to the first pitch to within 5% of each other.

12. The imaging system of claim 9, wherein the first and second gratings have substantially zero optical power.

13. The imaging system of claim 9, wherein at least one of the first or second gratings comprises a volumetric Bragg grating (VBG).

14. The imaging system of claim 9, further comprising a detector array at the focal plane for detecting the image of the object formed by the objective at the focal plane.

15. The imaging system of claim 9, wherein:
the object to be imaged is an eye viewing an image through a near-eye optic; and
the first direction forms an acute angle with an optical axis of the near-eye optic.

16. The imaging system of claim 15, wherein the first grating is mounted to the near-eye optic.

17. The imaging system of claim 9, wherein the PVH is configured to preferentially diffract light of a first circular polarization while transmitting light of an opposite circular polarization.

18. A method for reducing chromatic dispersion in a diffractive optical system including a first grating deflecting a polychromatic light beam in a first direction, the method comprising:

using a second grating to deflect the polychromatic light beam in a second direction opposite the first direction, wherein the second grating is disposed downstream of the first grating at a distance therefrom, wherein a magnitude of deflection of the polychromatic light beam by the second grating is less than a magnitude of deflection of the polychromatic light beam by the first grating;

wherein at least one of the first grating or the second grating comprises a polarization volumetric hologram (PVH) comprising a liquid crystal layer with a helical structure, and wherein the deflecting comprises propagating the polychromatic light beam through the first grating and the second grating.

19. The method of claim 18, wherein the first and second gratings deflect the polychromatic light beam substantially without focusing or defocusing the polychromatic light beam.

20. The method of claim 18, wherein the polychromatic light beam is provided by a source at a first optical distance from the first grating, wherein the second grating is disposed at a second optical distance from a virtual image of the source formed by the second grating, wherein the second optical distance is larger than the first optical distance, and wherein the deflection of the polychromatic light beam by the second grating lessens blurring of the virtual image of the source caused by chromatic dispersion of the first grating.

* * * * *